(12) United States Patent
Wang et al.

(10) Patent No.: US 10,978,964 B2
(45) Date of Patent: Apr. 13, 2021

(54) MEDIUM AND HIGH VOLTAGE ENERGY CONVERSION SYSTEM

(71) Applicant: SUNGROW POWER SUPPLY CO., LTD., Anhui (CN)

(72) Inventors: Xinyu Wang, Anhui (CN); Tao Zhao, Anhui (CN); Jiacai Zhuang, Anhui (CN); Jun Xu, Anhui (CN); Yilei Gu, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 129 days.

(21) Appl. No.: 16/239,160

(22) Filed: Jan. 3, 2019

(65) Prior Publication Data

US 2019/0305560 A1 Oct. 3, 2019

(30) Foreign Application Priority Data

Apr. 3, 2018 (CN) .......................... 201810289785.7

(51) Int. Cl.
*H02M 7/49* (2007.01)
*H02J 3/38* (2006.01)
(Continued)

(52) U.S. Cl.
CPC ............... *H02M 7/49* (2013.01); *H02J 3/383* (2013.01); *H02J 3/385* (2013.01);
(Continued)

(58) Field of Classification Search
CPC .... H02J 3/38; H02J 3/383; H02J 3/385; H02J 3/386; H02J 3/01; H02M 3/33569;
(Continued)

(56) References Cited

U.S. PATENT DOCUMENTS

| | | | |
|---|---|---|---|
| 10,090,701 B2 | 10/2018 | Yamada et al. | |
| 2008/0238195 A1* | 10/2008 | Shaver | H02J 3/385 |
| | | | 307/18 |

(Continued)

FOREIGN PATENT DOCUMENTS

| | | | |
|---|---|---|---|
| CN | 102983588 A | * | 3/2013 |
| CN | 107612405 A | | 1/2018 |

(Continued)

OTHER PUBLICATIONS

First Chinese Office Action regarding Application No. 201810289785.7 dated Nov. 11, 2019. English translation provided by Unitalen Attorneys at Law.

(Continued)

*Primary Examiner* — Nguyen Tran
*Assistant Examiner* — Jagdeep S Dhillon
(74) *Attorney, Agent, or Firm* — Harness, Dickey & Pierce, P.L.C.

(57) ABSTRACT

A medium and high voltage energy conversion system is provided. An input terminal of each of high-voltage isolated DC/DC converters in a phase circuit of the system is connected to a common DC bus. Each of the high-voltage isolated DC/DC converters converts, based on an open-loop control strategy or a closed-loop control strategy, a DC input voltage of a cascade module connected to the high-voltage isolated DC/DC converter into an instruction value related to a voltage of the common DC bus. A system controller of the system calculates, based on at least a voltage-current double loop control strategy, a three-phase modulation instruction to be sent to the cascade modules in three phases according to a parameter related to the voltage of the common DC bus, to implement grid-connected control on three phase circuits.

13 Claims, 8 Drawing Sheets

(51) Int. Cl.
*H02M 3/335* (2006.01)
*H02M 1/00* (2006.01)
*H02J 3/18* (2006.01)

(52) U.S. Cl.
CPC ....... *H02M 3/33569* (2013.01); *H02J 3/1814* (2013.01); *H02M 2001/0003* (2013.01); *H02M 2001/007* (2013.01); *H02M 2001/0077* (2013.01)

(58) Field of Classification Search
CPC ........... H02M 3/33584; H02M 7/5387; H02M 7/487; H02M 1/00; H02M 1/08; H02M 2001/007; H02M 5/12; H02M 5/00; H01M 14/00; H01L 27/301
USPC .............. 307/82, 80, 87, 81, 83, 66, 64
See application file for complete search history.

(56) References Cited

U.S. PATENT DOCUMENTS

| | | | | |
|---|---|---|---|---|
| 2010/0139743 | A1* | 6/2010 | Hadar | H05F 3/02 136/251 |
| 2011/0221274 | A1* | 9/2011 | Eaglesham | H01L 31/02021 307/43 |
| 2013/0200691 | A1* | 8/2013 | Crane | B63H 23/24 307/9.1 |
| 2015/0349583 | A1 | 12/2015 | Yamada et al. | |
| 2016/0190809 | A1* | 6/2016 | Ma | H02M 7/49 307/77 |
| 2017/0271974 | A1* | 9/2017 | Koivula | H02J 3/381 |
| 2018/0212535 | A1* | 7/2018 | Xia | H02M 7/5387 |
| 2019/0115830 | A1* | 4/2019 | Giuliano | H02M 3/07 |
| 2019/0229673 | A1* | 7/2019 | Liu | H02J 3/385 |
| 2019/0294187 | A1* | 9/2019 | Ying | H02M 7/49 |

FOREIGN PATENT DOCUMENTS

| | | |
|---|---|---|
| JP | 2016111810 A | 6/2016 |
| WO | WO-2014147771 A1 | 9/2014 |

OTHER PUBLICATIONS

First Japanese Office Action regarding Application No. 2019003729 dated Feb. 25, 2020. English translation provided by Unitalen Attorneys at Law.

Fan Zhang et al., "Design and Demonstration of a SiC-Based 800-V/10-kV 1-MW Solid-State Transformer for Grid-Connected Photovoltaic Systems," Third International Future Energy Electronics Conference, ECCE Asia, 2017, pp. 1987-1990.

Extended European Search Report regarding Internatinal Application No. 18214856.9 dated Jul. 10, 2019.

Liu, Liming, et al.: "A Coordintated Active and Reactive Power Control Strategy for Grid-Connected Cascaded Photovoltaic (PV) System in High Voltage High Power Applications," 2013 Twenty-Eighth Annual IEEE Applied Power Electronics Conference and Exposition; Mar. 17-21, 2013; pp. 1301-1308.

* cited by examiner

US 10,978,964 B2

MEDIUM AND HIGH VOLTAGE ENERGY CONVERSION SYSTEM

CROSS REFERENCE TO RELATED APPLICATION

The present application claims priority to Chinese Patent Application No. 201810289785.7, titled "MEDIUM AND HIGH VOLTAGE ENERGY CONVERSION SYSTEM", filed on Apr. 3, 2018 with the Chinese Patent Office, which is incorporated herein by reference in its entirety.

FIELD

The present disclosure relates to the technical field of photovoltaic power generation, and particularly to a medium and high voltage energy conversion system.

BACKGROUND

In the field of photovoltaic power generation, in order to output a medium and high voltage, output terminals of multiple H-bridge modules are usually cascaded; and high-voltage isolated direct current/direct current (DC/DC) converters are provided at input terminals of the multiple H-bridge modules, to implement maximum power point tracking (MPPT) control on connected photovoltaic panels. Moreover, in order to achieve current sharing, coupling control is required to be performed on the high-voltage isolated DC/DC converters, resulting in the complicated control strategy for the high-voltage isolated DC/DC converters, the high cost, and poor stability and reliability for the system output.

SUMMARY

A medium and high voltage energy conversion system is provided according to the present disclosure, to solve the problem in the conventional technology that the control strategy for the isolated DC/DC converter is complicated, the cost is high, and the stability and reliability of the system output are poor.

To achieve the above objective, the following technical solutions are provided according to the present disclosure.

A medium and high voltage energy conversion system is provided, which includes: at least one system controller and three grid-connected phase circuits connected in a star or delta connection. Each of the phase circuits includes: a filter module, multiple cascade modules, and multiple high-voltage isolated DC/DC converters. Output terminals of the multiple cascade modules are cascaded to form a branch, one end of the branch is connected to an input terminal of the filter module, and the other end of the branch functions as one output terminal of the phase circuits. An output terminal of the filter module functions as another output terminal of the phase circuits. Input terminals of the multiple cascade modules are connected to an output terminal of at least one of the multiple high-voltage isolated DC/DC converters. Input terminals of the multiple high-voltage isolated DC/DC converters are connected to a common DC bus. The high-voltage isolated DC/DC converter converts, based on an open-loop control strategy or a closed-loop control strategy, a DC input voltage of the cascade module connected to the high-voltage isolated DC/DC converter into an instruction value related to a voltage of the common DC bus. The system controller is configured to calculate: based on at least a voltage-current double loop control strategy, a three-phase modulation instruction to be sent to the cascade modules in three phases according to a parameter related to the voltage of the common DC bus, to implement grid-connected control on the three phase circuits.

In an embodiment, the system controller includes at least:
a voltage instruction setting unit, configured to set a voltage loop control instruction value;
a voltage feedback obtaining unit, configured to obtain a voltage loop feedback value;
a first subtracter, configured to calculate a first difference by subtracting the voltage loop feedback value from the voltage loop control instruction value;
a voltage loop controller, configured to obtain an active current loop instruction value based on the first difference;
a current instruction obtaining unit, configured to obtain a current loop instruction value, where the current loop instruction value includes the active current loop instruction value and a reactive current loop instruction value;
a current feedback obtaining unit, configured to obtain a current loop feedback value;
a second subtracter, configured to calculate a second difference by subtracting the current loop feedback value from the current loop instruction value; and
a current loop controller, configured to obtain the three-phase modulation instruction based on the second difference, where the three-phase modulation instruction includes three voltage modulation waves respectively sent to the three phases, and the voltage modulation waves received by the cascade modules in each of the three phases are the same.

In an embodiment, the voltage loop control instruction value represents the voltage value of the common DC bus; the voltage loop feedback value represents an actual voltage value of the common DC bus obtained by sampling, or a product of the actual voltage value of the common DC bus obtained by sampling and a first coefficient kbus;

or the voltage loop control instruction value represents a total DC input voltage of the cascade modules in the three phases; the voltage loop feedback value represents a sum of the DC input voltages of the cascade modules in the three phases, or the voltage loop feedback value represents a sum of the DC input voltages of the cascade modules in the three phases obtained by equivalent calculation, based on the actual voltage value of the common DC bus obtained by sampling, a ratio of an input voltage and an output voltage of the high-voltage isolated DC/DC converter, and the number of the cascade modules connected;

or the voltage loop control instruction value represents a total DC input voltage of the cascade modules in one of the three phases; the voltage loop feedback value represents a value obtained by dividing the sum of the DC input voltages of the cascade modules in the three phases by three, or the voltage loop feedback value represents a sum of the DC input voltages of the cascade modules in one of the three phases obtained by equivalent calculation, based on the actual voltage value of the common DC bus obtained by sampling, a ratio of an input voltage and an output voltage of the high-voltage isolated DC/DC converter, and the number of the cascade modules connected;

or the voltage loop control instruction value represents an average value of the DC input voltages of one of the cascade modules in each of the three phases; the voltage loop feedback value represents an average value obtained by dividing the sum of the DC input voltages of the cascade modules in the three phases by the total number of the cascade modules, or the voltage loop feedback value represents an average value of input voltages of the cascade modules obtained by equivalent calculation, based on the actual voltage value of the common DC bus obtained by sampling, a ratio of an input voltage and an output voltage of the high-voltage isolated DC/DC converter, and the number of the cascade modules connected.

In an embodiment, the medium and high voltage energy conversion system further includes: a system communication module, a system detection module, and a system auxiliary power supply;

the system detection module is configured to detect a voltage, a current, a temperature and an arc of the medium and high voltage energy conversion system;

the system communication module is configured to implement communication between the system controller and the three phase circuits and communication between the system controller and the outside; and the system auxiliary power supply is configured to supply power to the system communication module, the system detection module, and the system controller.

In an embodiment, each of the high-voltage isolated DC/DC converters includes: a first main circuit, a first communication module, a first detection module, a first auxiliary power supply, and at least one first controller;

the first controller is configured to control the first main circuit, detect and output a state of the high-voltage isolated DC/DC converter;

the first detection module is configured to detect a voltage, a current, a temperature and an arc of the high-voltage isolated DC/DC converter;

the first communication module is configured to implement communication between the first controller and the system controller; and the first auxiliary power supply is configured to supply power to the first communication module, the first detection module, and the first controller.

In an embodiment, for controlling the main circuit, the first controller is configured to:

set a fixed control value for the first main circuit based on a required input and output voltage value relationship of the first main circuit, and convert a DC input voltage of the cascade module connected to the first main circuit into the instruction value with the fixed control value, in a case that the open-loop control strategy is adopted; or control an operation of a switching transistor in the first main circuit, so as to convert the DC input voltage of the cascade module connected to the first main circuit into the instruction value, in a case that the closed-loop control strategy is adopted.

In an embodiment, the instruction value is obtained by taking the voltage of the common DC bus obtained by sampling as a reference value, or by taking a product of the voltage of the common DC bus obtained by sampling and a second coefficient k as a reference value.

In an embodiment, each of the cascade modules includes: a second main circuit, a second communication module, a second detection module, a second auxiliary power supply, and at least one second controller;

the second controller is configured to control the second main circuit in response to a control instruction from the system controller;

the second detection module is configured to detect a voltage, a current, a temperature, and an arc of the cascade module;

the second communication module is configured to implement communication between the second controller and the system controller; and the second auxiliary power supply is configured to supply power to the second communication module, the second detection module, and the second controller.

In an embodiment, for controlling the second main circuit in response to the control instruction from the system controller, the second controller is configured to:

obtain a normalized modulation wave by calculating a ratio of the modulation voltage in the three-phase modulation instruction to an actual DC input voltage of the second main circuit obtained by sampling, and control an operation of a switch transistor in the second main circuit based on the normalized modulation wave.

In an embodiment, the cascade module has any one of: an H-bridge topology, a Neutral Point Clamped (NPC) full-bridge topology, an NPC half-bridge topology, an Active Neutral Point Clamped (ANPC) full-bridge topology, an ANPC half-bridge topology, a T-type full-bridge topology, a T-type three-level half-bridge topology, a flying-capacitor full-bridge topology, and a hybrid five-level full-bridge topology; and the main circuit in the high-voltage isolated DC/DC converter has any one of: an LC series resonant topology, an LLC series resonant topology, a power bidirectional LC series resonant topology, a power bidirectional LLC series resonant topology, a dual active DC/DC topology and a full-bridge DC/DC topology.

In an embodiment, the common DC bus is connected to at least one photovoltaic module through multiple MPPT devices for achieving MPPT control; or the common DC bus is connected to a DC grid.

In an embodiment, the common DC bus is further connected to at least one of a load and a storage battery through a non-isolated DC/DC converter.

In an embodiment, each of the MPPT devices includes: a third main circuit, a third communication module, a third detection module, a third auxiliary power supply, and at least one third controller;

the third controller is configured to control the third main circuit in response to a control instruction from the system controller, detect and output a state of the MPPT device, where the control on the third main circuit includes the MPPT control implemented through controlling an operation of a switch transistor in the third main circuit;

the third detection module is configured to detect a voltage, a current, a temperature, and an arc of the MPPT device;

the third communication module is configured to implement communication between the third controller and the system controller; and the third auxiliary power supply is configured to supply power to the third communication module, the third detection module, and the third controller.

The medium and high voltage energy conversion system according to the present disclosure includes at least one system controller and three grid-connected phase circuits connected in a star or delta connection; the input terminals of the high-voltage isolated DC/DC converters in the phase circuits each are connected to the common DC bus; each of the high-voltage isolated DC/DC converters converts, based on the open-loop control strategy or the closed-loop control strategy, the DC input voltage of the cascade module connected to the high-voltage isolated DC/DC converter into the instruction value related to the voltage of the common DC bus; and the system controller calculates, based on at least a voltage-current double loop control strategy, the three-phase modulation instruction to be sent to the cascade modules in three phases according to the parameter related to the voltage of the common DC bus, to implement grid-connected control on the three phase circuits. In this way, the high-voltage isolated DC/DC converters can realize modular control with the same strategy, and can realize the current sharing without the coupling control in the conventional technology, thereby solving the problem in the conventional technology that the control strategy for the isolated DC/DC converter is complicated, the cost is high, and the stability and reliability of the system output are poor, due to the coupling control.

BRIEF DESCRIPTION OF THE DRAWINGS

For more clearly illustrating the technical solutions in embodiments of the present disclosure or the conventional technology, drawings referred to describe the embodiments or the conventional technology will be briefly described hereinafter. Apparently, the drawings in the following description illustrate only some embodiments of the present disclosure, and for those skilled in the art, other drawings may be obtained based on these drawings without any creative efforts.

DETAILED DESCRIPTION

The technical solutions according to embodiments of the present disclosure are described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, any other embodiments obtained by those skilled in the art without any creative efforts, fall within the protection scope of the present disclosure.

A medium and high voltage energy conversion system is provided according to the present disclosure, to solve the problem of low efficiency of the isolated DC/DC converter in the conventional technology.

The medium and high voltage energy conversion system includes a system communication module, a system detection module, a system auxiliary power supply, at least one system controller and three phase circuits. The three phase circuits may be connected in a star connection as shown in FIGS. 1a and 2a, or may be connected in a delta connection as shown in FIGS. 1b and 2b.

Figure 1A:
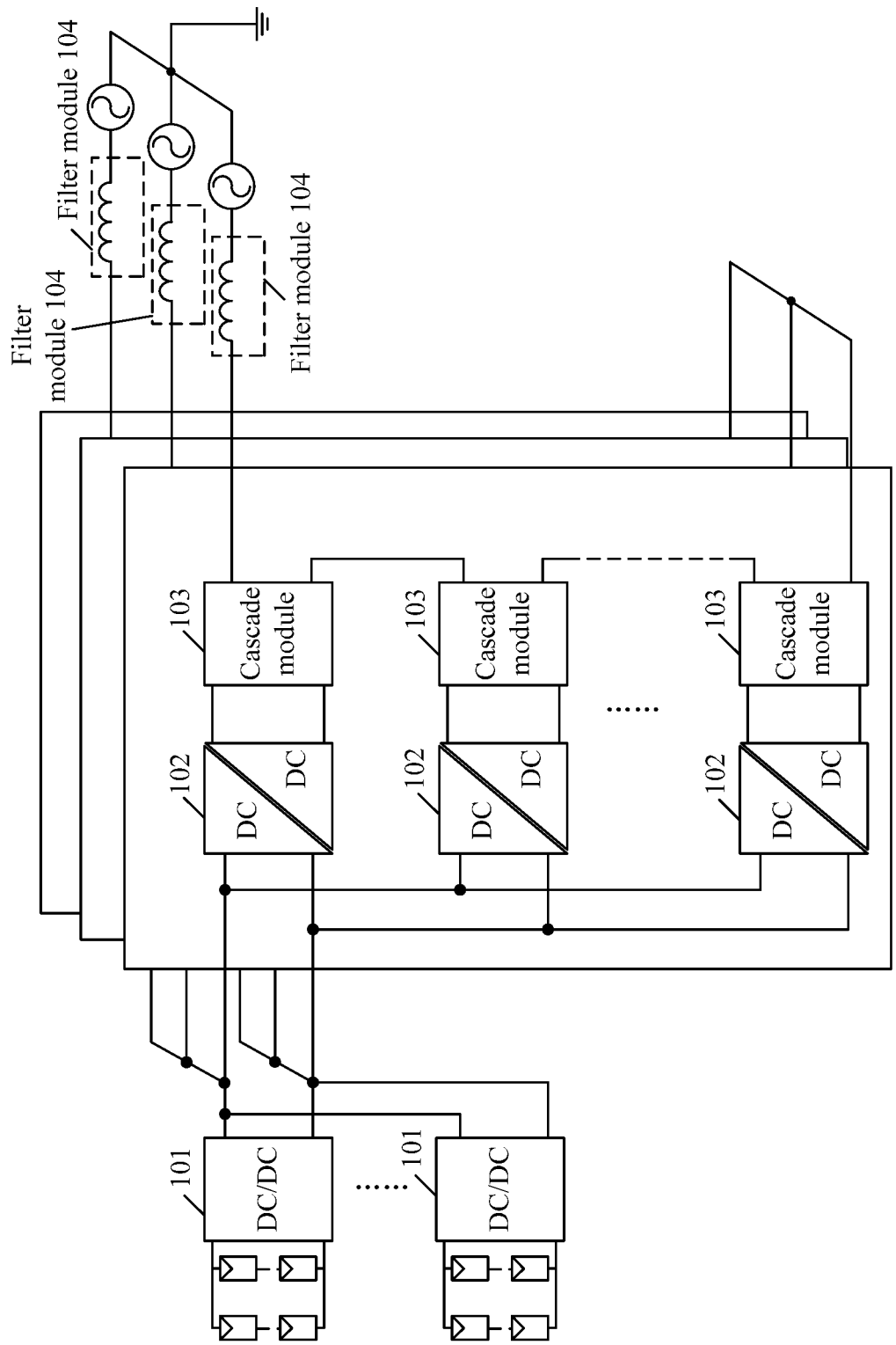
FIGS. 1a and 1b are schematic diagrams showing two structures of a main circuit in a medium and high voltage energy conversion system according to an embodiment of the present disclosure.
Figure 1B:
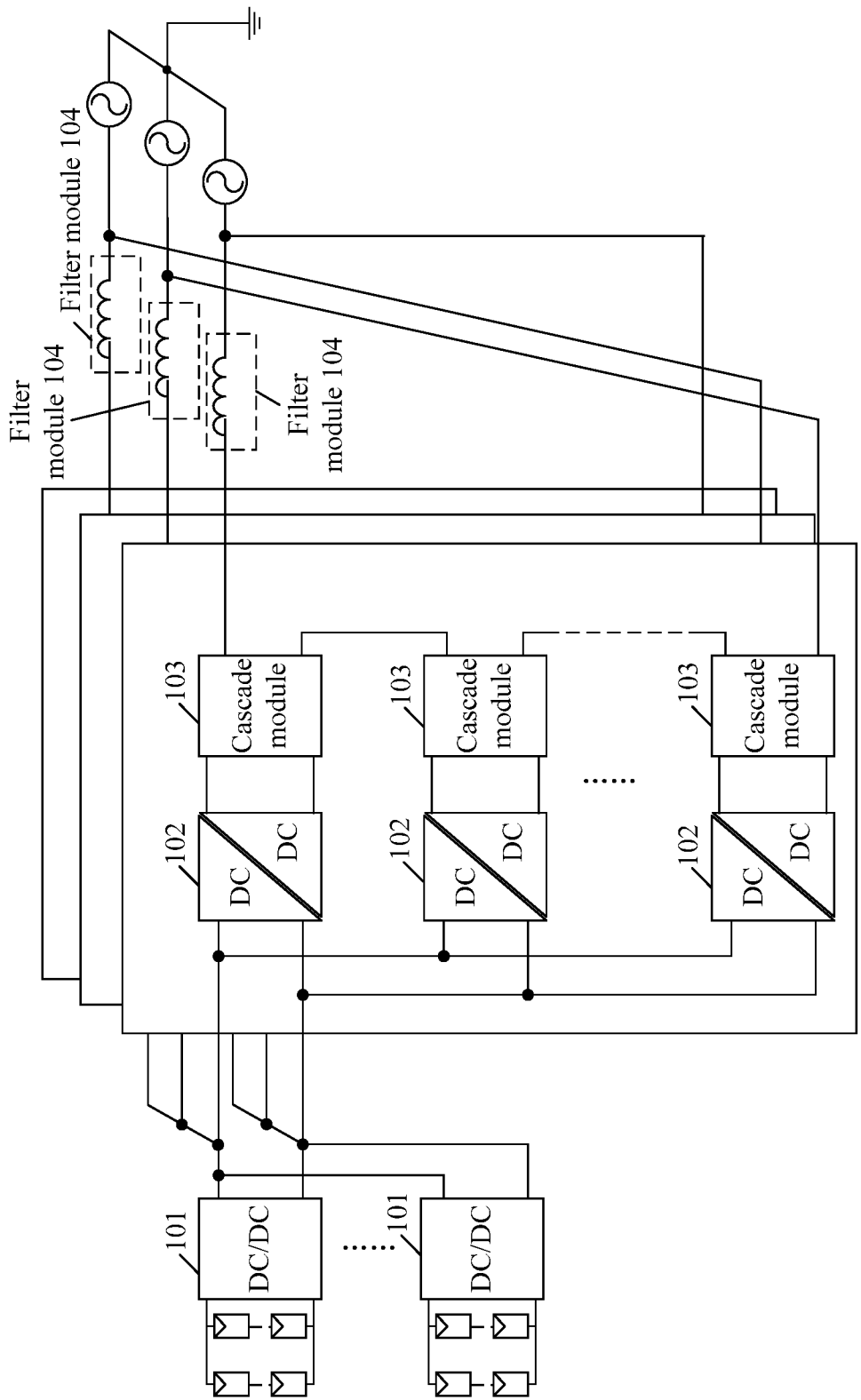
Figure 2A:
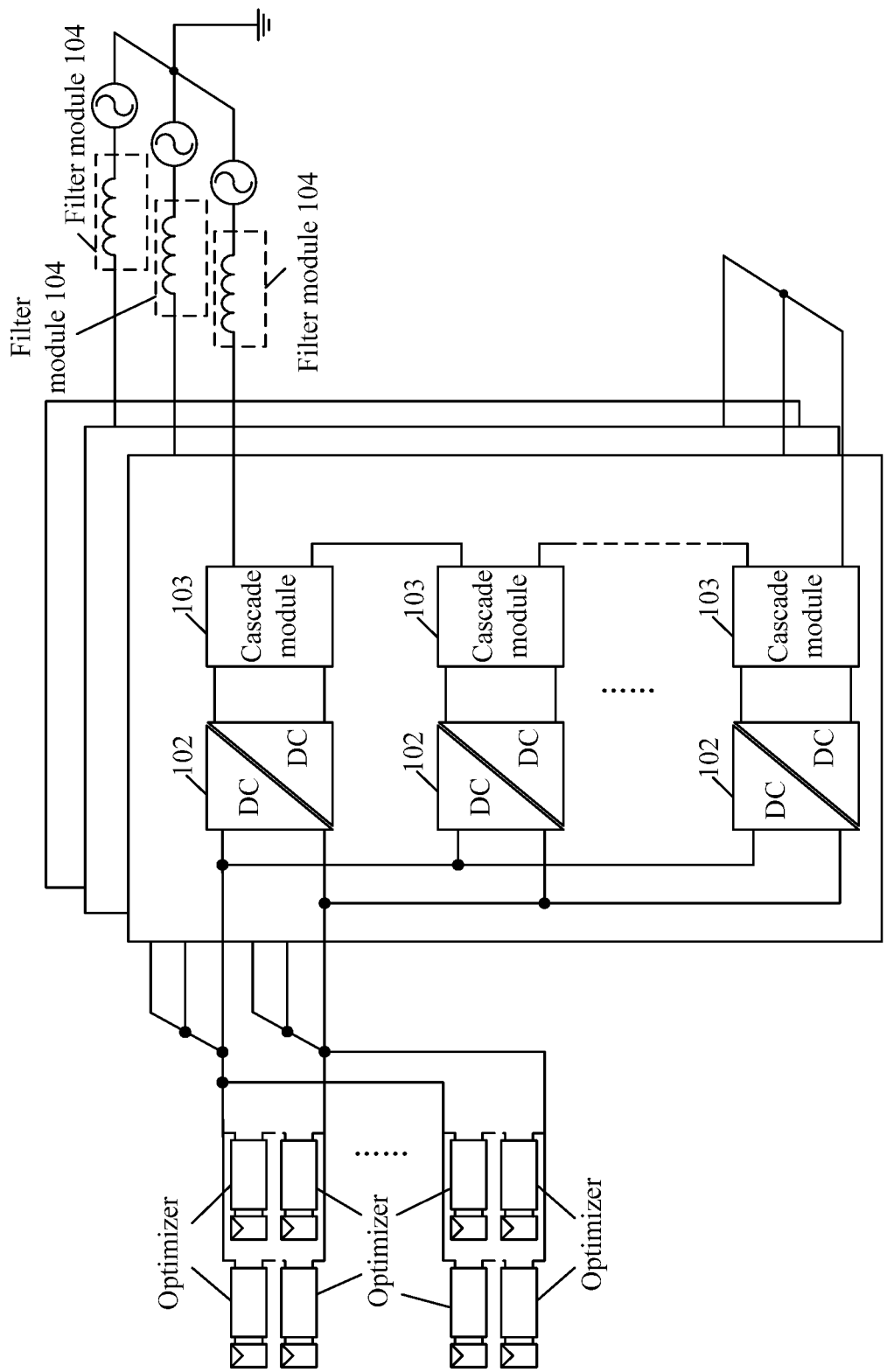
FIGS. 2a and 2b are schematic diagrams showing another two structures of a main circuit in a medium and high voltage energy conversion system according to an embodiment of the present disclosure.
Figure 2B:
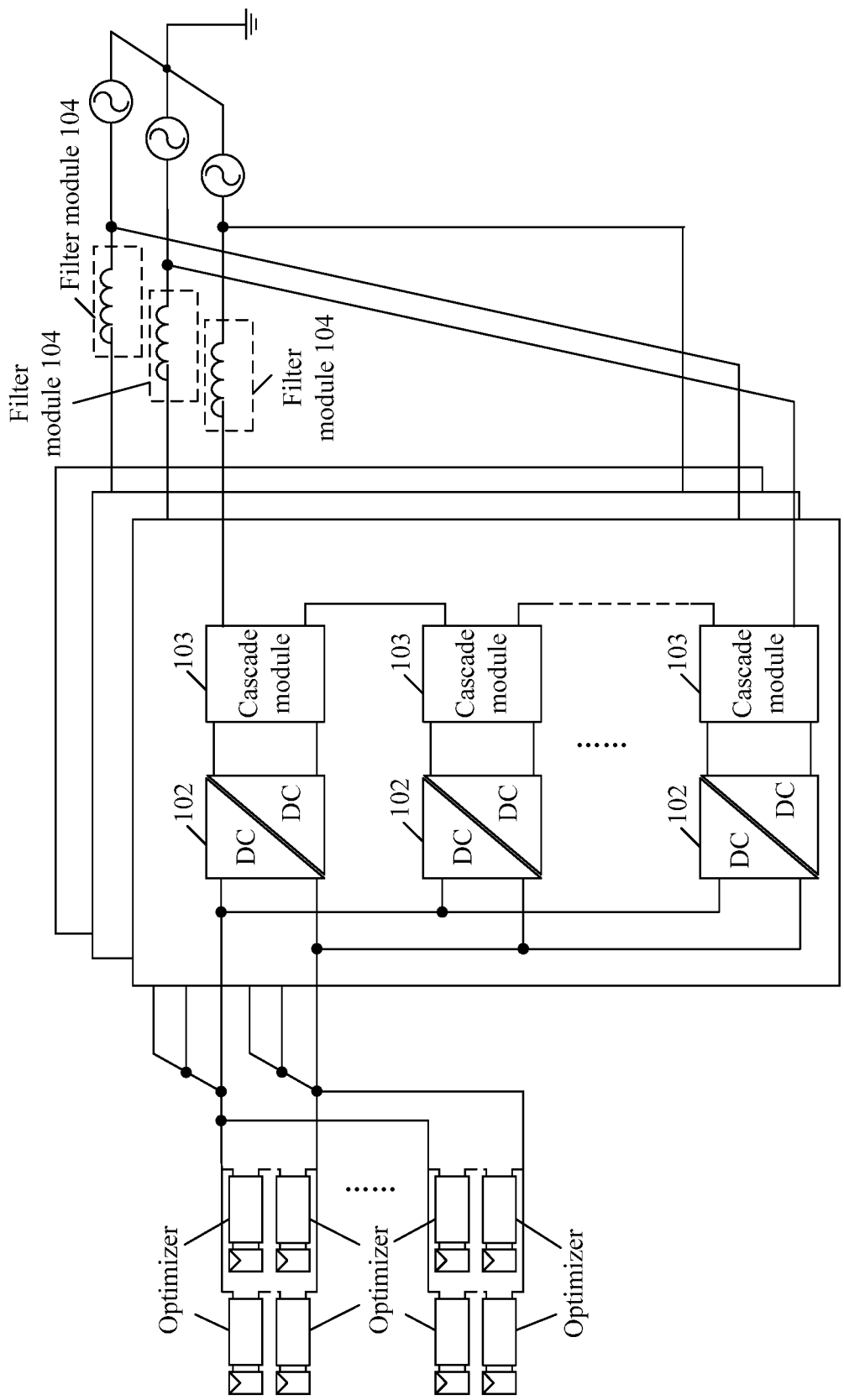

As shown in FIG. 1a or FIG. 1b, each of the three phase circuits includes: a filter module 104, multiple cascade modules 103, and multiple high-voltage isolated DC/DC converters 102.

Output terminals of the cascade modules 103 are cascaded to form a branch, one end of the branch is connected to an input terminal of the filter module 104, and the other end of the branch functions as one output terminal of the phase circuit.

An output terminal of the filter module 104 functions as another output terminal of the phase circuit.

Input terminals of the cascade modules 103 are connected to an output terminal of at least one of the high-voltage isolated DC/DC converters 102.

Input terminals of the high-voltage isolated DC/DC converters 102 are connected to a common DC bus.

In terms of control strategy, the high-voltage isolated DC/DC converter according to the present embodiment converts, based on an open-loop control strategy or a closed-loop control strategy, a DC input voltage of the cascade module connected to the high-voltage isolated DC/DC converter into an instruction value related to a voltage of the common DC bus.

In an embodiment, the high-voltage isolated DC/DC converter 102 includes: a first main circuit, a first communication module, a first detection module, a first auxiliary power supply, and at least one first controller.

The first controller is configured to control the first main circuit, detect and output a state of the high-voltage isolated DC/DC converter.

The first detection module is configured to detect a voltage, a current, a temperature and an arc of the high-voltage isolated DC/DC converter.

The first communication module is configured to implement communication between the first controller and the system controller.

The first auxiliary power supply is configured to supply power to the first communication module, the first detection module, and the first controller.

In an embodiment, the first controller may be configured to control the main circuit, based on the open-loop control strategy or the closed-loop control strategy.

If the open-loop control strategy is adopted, a fixed control value for the first main circuit may be set based on a required input and output voltage value relationship of the first main circuit, and a DC input voltage of the cascade module connected to the first main circuit is converted into the instruction value with the fixed control value. The fixed control value refers to an instruction control value set for the modulation method corresponding to the topology of the first main circuit. For example, for the first main circuit with a resonant topology, a fixed switching frequency may be used, or a fixed switching frequency and a fixed duty cycle may be used. For the first main circuit with a dual active DC/DC topology, a fixed phase shift angle may be used. The fixed control value is not limited herein, and may be determined based on the specific application environment. Various types of the fixed control value fall within the protection scope of the present disclosure.

If the closed-loop control strategy is adopted, an operation of a switching transistor in the first main circuit is controlled to convert a DC input voltage of the cascade module connected to the first main circuit into the instruction value. In a practical application, a specific modulation method may be determined based on the topology of the first main circuit. For example, for the first main circuit with the resonant topology, the switching frequency modulation may be used, or the switching frequency and duty cycle modulation may be used. For the first main circuit with the dual active DC/DC topology, the phase shift angle modulation may be used. Moreover, the instruction value may be obtained by taking an input voltage of the first main circuit obtained by sampling (that is the voltage of the common DC bus) as a reference value, or by taking a product of the input voltage of the first main circuit obtained by sampling and a second coefficient k as the reference value. The instruction value is not limited herein and may be determined based on the specific application environment. Various types of the instruction value fall within the protection scope of the present disclosure. For example, it is assumed that the high-voltage isolated DC/DC converter is an isolated LC series resonant converter with a transformer ratio of 1:1, the input voltage of the first main circuit may be directly set as an instruction value, that is, the second coefficient k is set to be 1. In this case, the instruction value may also be set to be smaller than the input voltage. For example, the second coefficient k is set to be 0.99, based on a fact that the gain adjustment capability of some types of isolated DC/DC converters is limited. Taking a resonant converter as an example, under certain load conditions, due to the difference in resonant inductor capacitance parameters, if the output voltage is to be adjusted to be equal to the input voltage, that is, the gain is 1, a larger switching frequency may be required or the gain of 1 is impossible to be realized. The gain adjustment capability of the high-voltage isolated DC/DC converter can be appropriately improved by the coefficient k. For example, it is assumed that the high-voltage isolated DC/DC converter is an isolated LLC series resonant converter with a transformer ratio of 2:1, the input voltage of the first main circuit may be directly set as an instruction value, that is, the second coefficient k is set to be 1; ½ of the input voltage of the first main circuit may be directly set as the instruction value, that is, the second coefficient k is set to be 0.5 based on the relationship of the transformer ratio; or the instruction value may be set to be less than ½ of the input voltage. For example, the second coefficient k is set to be 0.49 based on the transformer ratio and based on a fact that the gain adjustment capability of some types of isolated DC/DC converters is limited. The gain adjustment capability of the high-voltage isolated DC/DC converter can be appropriately improved by the second coefficient k. The specific reasons are the same as above, which are not be repeated here.

Accordingly, in the medium and high voltage energy conversion system, the system detection module is configured to detect a voltage, a current, a temperature and an arc of the medium and high voltage energy conversion system. The system communication module is configured to implement communication between the system controller and the three phase circuits and communication between the system controller and the outside. The system auxiliary power supply is configured to supply power to the system communication module, the system detection module, and the system controller. The system controller is configured to calculate, based on at least a voltage-current double loop control strategy, a three-phase modulation instruction to be sent to the cascade modules 103 in three phases according to a parameter related to the voltage of the common DC bus, to implement grid-connected control on the three phase circuits.

Since the control strategy for the system controller includes at least the voltage-current double loop control strategy, optionally, the system controller includes at least: a voltage instruction setting unit, a voltage feedback obtaining unit, a first subtracter, a voltage loop controller, a current instruction obtaining unit, a current feedback obtaining unit, a second subtracter, and a current loop controller.

The voltage instruction setting unit is configured to set a voltage loop control instruction value. The voltage loop control instruction value may represent a total DC input voltage of all the cascade modules, a total DC input voltage of all the cascade modules in one phase, an average value of the DC input voltages of a single cascade module in each of the three phases, or the voltage value of the common DC bus. In addition, the set voltage loop control instruction value may be a fixed value or a value changing in a certain range. The voltage loop control instruction value is not limited herein, and may be determined based on the specific application environment. Various types of the voltage loop control instruction value fall within the protection scope of the present disclosure.

The voltage feedback obtaining unit is configured to obtain a voltage loop feedback value. The voltage loop feedback value may be calculated by sampling the DC input voltage of each of the cascade modules 103 or the voltage of the common DC bus. Specifically, the voltage loop feedback value may be obtained by calculating a sum the DC input voltages of all the cascade modules in the three phases, or dividing the sum of the DC input voltages of all the cascade modules in the three phases by three, or dividing the sum of the DC input voltages of all the cascade modules in the three phases by the total number of the cascade modules 103, or calculating a product of an actual voltage value of the common DC bus obtained by sampling and a coefficient kbus. In addition, the voltage loop feedback value may be obtained by equivalently calculating the sum of the DC input voltages of all the cascade modules in the three phases, the sum of the DC input voltages of all the cascade modules in one phase or an average value of the input voltages of the cascade modules, based on a relationship between the voltage value of the common DC bus obtained by sampling, a ratio of an input voltage and an output voltage of the high-voltage isolated DC/DC converters 102, and the number of the cascade modules 103, as long as the obtained voltage loop feedback value corresponds to the above voltage loop control instruction value. In a case that the voltage value of the common DC bus is set as the voltage loop control instruction value, the actual voltage value of the common DC bus obtained by sampling may directly function as the voltage loop feedback value, or a product of the actual voltage value of the common DC bus obtained by sampling and a first coefficient kbus may function as the voltage loop feedback value. The voltage loop feedback value is not limited herein, and may be determined based on the specific application environment. Various types of the voltage loop feedback value falls within the protection scope of the present disclosure.

In the practical application, the voltage loop input may be set as follows.

The voltage loop control instruction value is set as the voltage value of the common DC bus. The voltage loop feedback value is set as the actual voltage value of the common DC bus obtained by sampling, or a product of the actual voltage value of the common DC bus obtained by sampling and the first coefficient kbus.

Alternatively, the voltage loop control instruction value is set as a total DC input voltage of the cascade modules in the three phases. The voltage loop feedback value is set as a sum of the DC input voltages of the cascade modules in the three phases, or the voltage loop feedback value is set as a sum of the DC input voltages of the cascade modules in the three phases obtained by equivalent calculation, based on the actual voltage value of the common DC bus obtained by sampling, the ratio of the input voltage and the output voltage of the high-voltage isolated DC/DC converter, and the number of the cascade modules connected.

Alternatively, the voltage loop control instruction value is set as the total DC input voltage of the cascade modules in one phase. The voltage loop feedback value is set as a value obtained by dividing the sum of the DC input voltages of the cascade modules in the three phases by three, or a sum of the DC input voltages of the cascade modules in one phase obtained by equivalent calculation, based on the actual voltage value of the common DC bus obtained by sampling, the ratio of the input voltage and the output voltage of the high-voltage isolated DC/DC converter, and the number of the cascaded modules connected.

Alternatively, the voltage loop control instruction value is set as an average value of the DC input voltages of a single cascade module in each of the three phases. The voltage loop feedback value is set as an average value obtained by dividing the sum of the DC input voltages of the cascade modules in the three phases by the total number of the cascade modules, or an average value of the input voltages of the cascade modules obtained by equivalent calculation, based on the actual voltage value of the common DC bus obtained by sampling, the ratio of the input voltage and the output voltage of the high-voltage isolated DC/DC converter, and the number of the cascade modules connected.

The first subtracter is configured to calculate a first difference by subtracting the voltage loop feedback value from the voltage loop control instruction value The voltage loop controller is configured to obtain an active current loop instruction value based on the first difference. The voltage loop controller may be a PID controller, a sliding mode controller or a hysteresis controller. The voltage loop controller is not limited herein, and may be determined according to the specific application environment. Various types of voltage loop controllers fall within the protection scope of the present disclosure.

The current instruction obtaining unit is configured to obtain a current loop instruction value. The current loop instruction value includes an active current loop instruction value and a reactive current loop instruction value. The reactive current loop instruction value may be set according to actual needs, such as setting to be 0 or other values. The current loop instruction value is not limited herein, and may be determined according to the specific application environment. Various types of the current loop instruction values fall within the protection scope of the present disclosure.

The current feedback obtaining unit is configured to obtain a current loop feedback value. The current loop feedback value is obtained by sampling three-phase grid-connected current.

The second subtracter is configured to calculate a second difference by subtracting the current loop feedback value from the current loop instruction value.

The current loop controller is configured to obtain the three-phase modulation instruction based on the second difference. Here, a grid voltage feedforward control may be added. The current loop controller may be a PID controller, a sliding mode controller or a hysteresis controller. The current loop controller is not limited herein and may be determined according to the specific application environment. Various types of current loop controllers fall within the protection scope of the present disclosure. The three-phase modulation instruction is allocated to each of the cascade modules 103 in the three phases. The three-phase modulation instruction includes three voltage modulation waves respectively sent to the three phases, and the voltage modulation waves received by the cascade modules 103 in each phase are the same. Specifically, the voltage modulation waves received by the three phases may be different from each other by 120°. The voltage modulation wave is not limited herein, and may be determined based on the specific application environment. Various types of voltage modulation waves fall within the protection scope of the present disclosure.

In the practical application, the three-phase modulation instruction may be generated by a commonly used dq/abc conversion method. That is, the output of the voltage loop functions as the input of the d-axis current loop, the reactive current instruction functions as the input of the q-axis current loop, and abc/dq conversion is performed on the three-phase grid current to obtain the d-axis current feedback value and the q-axis current feedback value. Then dq/abc conversion is performed on the output of the d-axis current loop and the q-axis current loop (which may or may not include the grid voltage feedforward value) to obtain a three-phase modulation voltage, that is, each node of each voltage modulation wave.

Each of the cascade modules 103 mainly includes: a second main circuit, a second communication module, a second detection module, a second auxiliary power supply, and at least one second controller.

The second controller is configured to control the second main circuit in response to a control instruction from the system controller.

The second detection module is configured to detect a voltage, a current, a temperature, and an arc of the cascade module.

The second communication module is configured to implement communication between the second controller and the system controller.

The second auxiliary power supply is configured to supply power to the second communication module, the second detection module, and the second controller.

Corresponding to the control strategy for the system controller, preferably, for controlling the second main circuit in response to the control instruction from the system controller, the second controller is configured to obtain a normalized modulation wave by calculating a ratio of the modulation voltage in the three-phase modulation instruction to the actual DC input voltage of the second main circuit obtained by sampling, and control the operation of the switch transistor in the second main circuit based on the normalized modulation wave.

With the control strategy combining the high-voltage isolated DC/DC converters, the system controller and the three-phase cascade modules 103 according to the present embodiment, the high-voltage isolated DC/DC converters can realize modular control with the same strategy and the current sharing can be realized without the coupling control in the conventional technology. Compared with the conventional control strategy, according to solutions of the present embodiment, the complexity of the system control is greatly reduced, the system control is simple and easy to be implemented, thereby reducing the control cost, and improving the stability and reliability of the system output.

Figure 3:
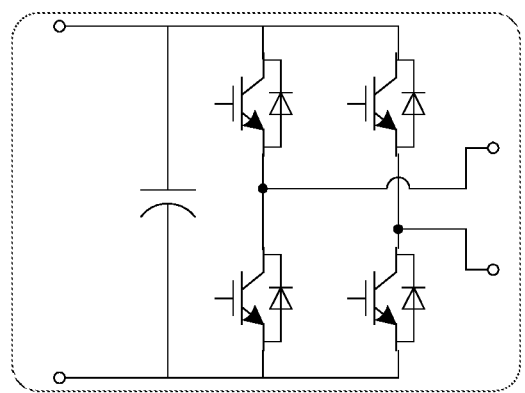
FIG. 3 is a schematic circuit diagram showing a main circuit in a cascade module according to an embodiment of the present disclosure.

A medium and high voltage energy conversion system is further provided according to another embodiment of the present disclosure. Based on the above embodiment and FIGS. 1a to 5c, optionally, each of the cascade modules 103 has any one of: an H-bridge topology (as shown in FIG. 3), an NPC full-bridge topology, an NPC half-bridge topology, an ANPC full-bridge topology, an ANPC half-bridge topology, a T-type full-bridge topology, a T-type three-level half-bridge topology, a flying-capacitor full-bridge topology, and a hybrid five-level full-bridge topology.

Figure 4A:
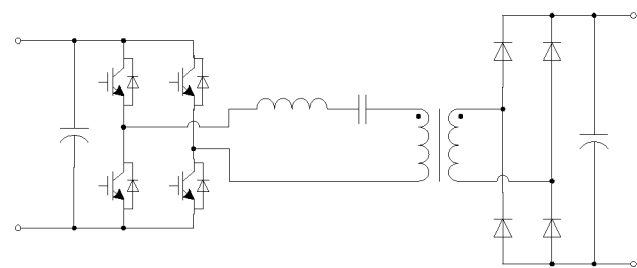
FIGS. 4a to 4d are four types of schematic circuit diagrams showing a main circuit in a high-voltage isolated DC/DC converter according to an embodiment of the present disclosure.
Figure 4B:
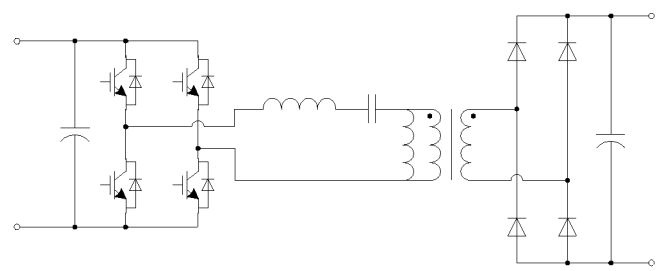
Figure 4C:
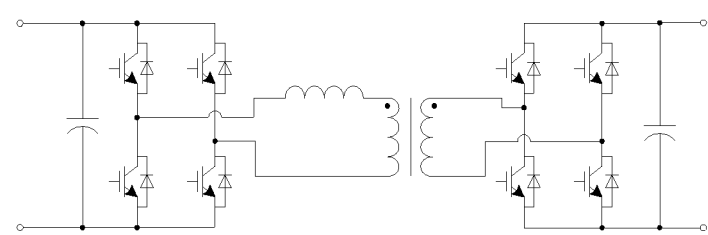
Figure 4D:
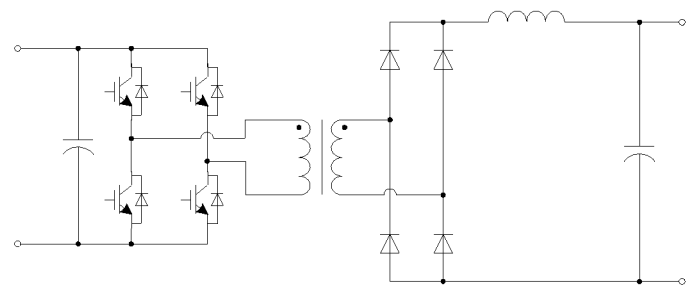

Optionally, the high-voltage isolated DC/DC converter 102 has any one of a power unidirectional resonant converter, a power bidirectional resonant converter, a power unidirectional non-resonant converter, and a power bidirectional non-resonant converter. The main circuit in the high-voltage isolated DC/DC converter 102 may have any one of an LC series resonant topology (as shown in FIG. 4a), an LLC series resonant topology (as shown in FIG. 4b), a dual active DC/DC topology (as shown in FIG. 4c), a full-bridge DC/DC topology (as shown in FIG. 4d), a power bidirectional LC series resonant topology (not shown), and a power bidirectional LLC series resonant topology (not shown). Other types of topology may be selected based on the specific application environment, which is not limited herein. Various types of topology fall within the protection scope of the present disclosure.

Figure 5A:
FIGS. 5a to 5c are three types of schematic circuit diagrams showing a main circuit in a filter module according to an embodiment of the present disclosure.
Figure 5B:
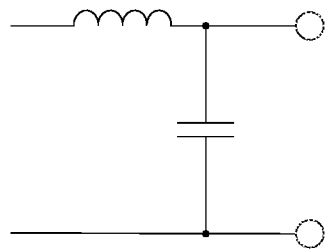
Figure 5C:
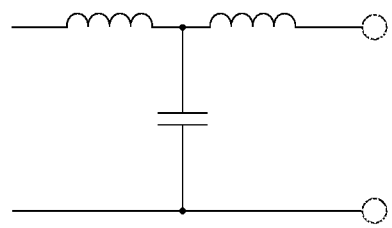

In practical applications, the filter module 104 may be: any one of an L filter as shown in FIG. 1, FIG. 2 and FIG. 5a, an LC filter shown in FIG. 5b, an LCL filter shown in FIG. 5c, and a high order filter not shown. Other types of filters may be selected according to the specific application environment, which are not limited herein. Various types of filters fall within the protection scope of the present disclosure.

In addition, the control strategy described in the above embodiments may be applied to a photovoltaic power generation system with a photovoltaic module, or applied to an energy router system that receives the grid electric energy. That is, the common DC bus is connected to at least one photovoltaic module through multiple MPPT devices for achieving MPPT control, or the common DC bus is connected to a DC grid. Alternatively, the common DC bus may be connected to a load and/or a storage battery through a non-isolated DC/DC converter. In summary, the common DC bus can obtain at least DC electric energy, so that a grid connection function of an AC grid can be realized by the above control strategy. Based on this, the common DC bus can output DC electric energy to the storage battery or the load. The common DC bus is not limited herein, and may be determined according to the specific application environment. Various types of common DC bus fall within the protection scope of the present disclosure.

In FIGS. 1a and 1b, a non-isolated DC/DC converter 101 functions as an MPPT device for implementing MPPT control, and the output terminals of the non-isolated DC/DC converters 101 are connected to the common DC bus. Alternatively, the output terminals of at least two non-isolated DC/DC converters 101 are connected in series and then connected in parallel with the common DC bus (not shown).

The input terminals of the non-isolated DC/DC converters 101 are configured to connect to a DC power supply in the photovoltaic power generation system. Optionally, the DC power supply is a storage battery or at least one photovoltaic module. In this case, the input terminal of at least one non-isolated DC/DC converter 101 is connected to the storage battery, and the input terminal of at least one non-isolated DC/DC converter 101 is connected to at least one photovoltaic module.

Alternatively, as shown in FIGS. 2a and 2b, a module-level optimizer functions as the MPPT device for implementing MPPT control. Input terminals of the optimizers are connected to at least one storage battery or photovoltaic module, and output terminals of multiple optimizers are connected in series to form an optimizer set. At least one optimizer set is connected to the common DC bus, or at least one optimizer set is connected to the common DC bus via a combiner box (not shown).

The MPPT device may be implemented as the non-isolated DC/DC converter 101 or the module-level optimizer. As long as the high-voltage isolated DC/DC converter 102 is replaced to implement the MPPT control scheme, the substitute of the high-voltage isolated DC/DC converter falls within the protection scope of the present disclosure.

In the practical design process, since the MPPT control function achieved by the high-voltage isolated DC/DC converter 102 in the conventional technology is achieved by the MPPT devices, the high-voltage isolated DC/DC converter 102 is unnecessary to perform MPPT control and real-time voltage regulation on the connected photovoltaic panel. A gain range of the high-voltage isolated DC/DC converter 102, that is, the quotient obtained by dividing the maximum gain of the ratio of the output voltage to the input voltage by the minimum gain of the ratio of the output voltage to the input voltage, can be designed to be small. Specifically, the gain of the high-voltage isolated DC/DC converter 102 can be designed to be greater than or equal to 1 and less than 1.5, for example, designed to be 1.5 or less. The high-voltage isolated DC/DC converter 102 can even be designed to have a fixed gain, and open-loop control is performed, so that a pressure of a high frequency transformer can be directly reduced, and the control function of the high-voltage isolated DC/DC converter 102 is further simplified, thereby reducing the design difficulty and the system cost of the high-voltage isolated DC/DC converter 102.

In an embodiment, the MPPT device, for example the non-isolated DC/DC converter 101 as shown in FIGS. 1a and 1b, includes: a third main circuit, a third communication module, a third detection module, a third auxiliary power supply, and at least one third controller.

The third controller is configured to control the third main circuit in response to the control instruction from the system controller, detect and output a state of the non-isolated DC/DC converter. The control on the third main circuit includes the MPPT control implemented through controlling an operation of a switch transistor in the third main circuit, and control performed in response to turning-off, standby, and starting instructions.

The third detection module is configured to detect a voltage, a current, a temperature, and an arc of the non-isolated DC/DC converter.

The third communication module is configured to implement communication between the third controller and the system controller.

The third auxiliary power supply is configured to supply power to the third communication module, the third detection module, and the third controller.

In a practical application, the number of the system controller of the medium and high voltage energy conversion system, the number of the first controller in the cascade module 103, the number of the second controller in the high-voltage isolated DC/DC converter 102, and the number of the third controller in the non-isolated DC/DC converter 101 each may be greater than one, and the system controller, the first controller, the second controller and the third controller each may be implemented by any one of a Central Processing Unit (CPU), a Microcontroller Unit (MCU), and a Digital Signal Processor (DSP), an ARM processor, a Field-Programmable Gate Array (FPGA), a Complex Programmable Logic Device (CPLD), and an Application Specific Integrated Circuits (ASIC) chip, which may be determined according to the specific application environment.

The controllers described above are not limited here, and various types of controllers fall within the protection scope of the present disclosure.

The specific implementation of the above communication module, the detection module, and the auxiliary power supply is determined according to the environment, and is not limited herein. Various types of communication modules, detection modules and auxiliary power supplies fall within the protection scope of the present disclosure.

In the embodiment, the control strategy for the high-voltage isolated DC/DC converter and the control strategy for the non-isolated DC/DC converter each can be independently executed by the DC/DC converter, thereby realizing a true modular design and reducing the difficulty in system design, construction and installation, and later operation and maintenance.

Other principles are the same as those in the above embodiments, and are not repeated here anymore.

The embodiments of the present disclosure are described in a progressive manner, and each embodiment is focused on describing difference from other embodiments. For the same or similar parts among the embodiments, one may refer to description of other embodiments. Since the device disclosed in the embodiment corresponds to the method disclosed in the embodiment, the description for the device is simple. For the relevant parts, one may refer to the description of the method embodiments.

Only preferred embodiments of the present disclosure are described above, and are not intended to limit the present disclosure in any way. Numerous possible alternations, modifications, and equivalents can be made to the technical solutions of the present disclosure by those skilled in the art in accordance with the methods and technical content disclosed above without deviating from the scope of the technical solution of the present disclosure. Therefore, any alternations, modifications and equivalents made to the embodiments above according to the technical essential of the present disclosure without deviating from the technical solution of the present disclosure should fall within the protection scope of the present disclosure.

The invention claimed is:

1. A medium and high voltage energy conversion system, comprising:
    at least one system controller; and
    three grid-connected phase circuits connected in a star or delta connection, each of the phase circuits comprising:
        a filter module, a plurality of cascade modules, and a plurality of high-voltage isolated direct current/direct current (DC/DC) converters, wherein
    output terminals of the plurality of cascade modules are cascaded to form a branch, one end of the branch is connected to an input terminal of the filter module, and the other end of the branch functions as one output terminal of any of the three grid-connected phase circuits;
    an output terminal of the filter module functions as another output terminal of the phase circuits;
    input terminals of the plurality of cascade modules are connected to an output terminal of at least one of the plurality of high-voltage isolated DC/DC converters;
    input terminals of the plurality of high-voltage isolated DC/DC converters are connected to a common DC bus;
    the high-voltage isolated DC/DC converter converts, based on an open-loop control strategy or a closed-loop control strategy, DC input voltages of all the cascade modules connected to the high-voltage isolated DC/DC converter into an instruction value related to a voltage of the common DC bus; and
    the system controller is configured to calculate, based on at least a voltage-current double loop control strategy, a three-phase modulation instruction to be sent to the cascade modules in three phases according to a parameter related to the voltage of the common DC bus, to implement grid-connected control on the three phase circuits.

2. The medium and high voltage energy conversion system according to claim 1, wherein the system controller comprises at least:
    a voltage instruction setting unit, configured to set a voltage loop control instruction value;
    a voltage feedback obtaining unit, configured to obtain a voltage loop feedback value;
    a first subtracter, configured to calculate a first difference by subtracting the voltage loop feedback value from the voltage loop control instruction value;
    a voltage loop controller, configured to obtain an active current loop instruction value based on the first difference;
    a current instruction obtaining unit, configured to obtain a current loop instruction value, wherein the current loop instruction value comprises the active current loop instruction value and a reactive current loop instruction value;
    a current feedback obtaining unit, configured to obtain a current loop feedback value;
    a second subtracter, configured to calculate a second difference by subtracting the current loop feedback value from the current loop instruction value; and
    a current loop controller, configured to obtain the three-phase modulation instruction based on the second difference, and the three-phase modulation instruction comprises three voltage modulation waves respectively sent to the three phases, and the voltage modulation waves received by the cascade modules in each of the three phases are the same.

3. The medium and high voltage energy conversion system according to claim 2, wherein the voltage loop control instruction value represents the voltage value of the common DC bus; the voltage loop feedback value represents an actual voltage value of the common DC bus obtained by sampling, or a product of the actual voltage value of the common DC bus obtained by sampling and a first coefficient kbus;
    or the voltage loop control instruction value represents a total DC input voltage of the cascade modules in the three phases; the voltage loop feedback value represents a sum of the DC input voltages of the cascade modules in the three phases, or the voltage loop feedback value represents a sum of DC input voltages of the cascade modules in the three phases obtained by equivalent calculation, based on the actual voltage value of the common DC bus obtained by sampling, a ratio of an input voltage and an output voltage of the high-voltage isolated DC/DC converter, and the number of the cascaded modules connected;
    or the voltage loop control instruction value represents a total DC input voltage of the cascade modules in one of the three phases; the voltage loop feedback value represents a value obtained by dividing the sum of the DC input voltages of the cascade modules in the three phases by three, or the voltage loop feedback value represents a sum of DC input voltages of the cascade modules in one of the three phases obtained by equivalent calculation, based on the actual voltage value of the common DC bus obtained by sampling, a ratio of an input voltage and an output voltage of the high-voltage isolated DC/DC converter, and the number of the cascade modules connected;

or the voltage loop control instruction value represents an average value of the DC input voltages of one of the cascade modules in each of the three phases; the voltage loop feedback value represents an average value obtained by dividing the sum of the DC input voltages of the cascade modules in the three phases by total number of the cascade modules, or the voltage loop feedback value represents an average value of input voltages of the cascade modules obtained by equivalent calculation, based on the actual voltage value of the common DC bus obtained by sampling, a ratio of an input voltage and an output voltage of the high-voltage isolated DC/DC converter, and the number of the cascade modules connected.

4. The medium and high voltage energy conversion system according to claim 1, further comprising:
    a system detection module configured to detect a voltage, a current, a temperature and an arc of the medium and high voltage energy conversion system;
    a system communication module configured to implement communication between the system controller and the three phase circuits and communication between the system controller and outside; and
    a system auxiliary power supply configured to supply power to the system communication module, the system detection module, and the system controller.

5. The medium and high voltage energy conversion system according to claim 1, wherein each of the high-voltage isolated DC/DC converters comprises: a first main circuit, a first communication module, a first detection module, a first auxiliary power supply, and at least one first controller, and wherein the first controller is configured to control the first main circuit, detect and output a state of the high-voltage isolated DC/DC converter;
    the first detection module is configured to detect a voltage, a current, a temperature and an arc of the high-voltage isolated DC/DC converter;
    the first communication module is configured to implement communication between the first controller and the system controller; and
    the first auxiliary power supply is configured to supply power to the first communication module, the first detection module, and the first controller.

6. The medium and high voltage energy conversion system according to claim 5, wherein for controlling the main circuit, the first controller is configured to:
    set a fixed control value for the first main circuit based on a required input and output voltage value relationship of the first main circuit, and convert DC input voltages of all the cascade modules connected to the first main circuit into the instruction value with the fixed control value, in a case that the open-loop control strategy is adopted; or
    control an operation of a switching transistor in the first main circuit, so as to convert the DC input voltages of the cascade modules connected to the first main circuit into the instruction value, in a case that the closed-loop control strategy is adopted.

7. The medium and high voltage energy conversion system according to claim 6, wherein the instruction value is obtained by taking the voltage of the common DC bus obtained by sampling as a reference value, or by taking a product of the voltage of the common DC bus obtained by sampling and a second coefficient k as a reference value.

8. The medium and high voltage energy conversion system according to claim 1, wherein each of the cascade modules comprises: a second main circuit, a second communication module, a second detection module, a second auxiliary power supply, and at least one second controller, and wherein
    the second controller is configured to control the second main circuit in response to a control instruction from the system controller;
    the second detection module is configured to detect a voltage, a current, a temperature, and an arc of the cascade module;
    the second communication module is configured to implement communication between the second controller and the system controller; and
    the second auxiliary power supply is configured to supply power to the second communication module, the second detection module, and the second controller.

9. The medium and high voltage energy conversion system according to claim 8, wherein for controlling the second main circuit in response to the control instruction from the system controller, the second controller is configured to:
    obtain a normalized modulation wave by calculating a ratio of a modulation voltage in the three-phase modulation instruction to an actual DC input voltage of the second main circuit obtained by sampling, and control an operation of a switch transistor in the second main circuit based on the normalized modulation wave.

10. The medium and high voltage energy conversion system according to claim 1, wherein each of the cascade modules has any one of an H-bridge topology, a Neutral Point Clamped (NPC) full-bridge topology, an NPC half-bridge topology, an Active Neutral Point Clamped (ANPC) full-bridge topology, an ANPC half-bridge topology, a T-type full-bridge topology, a T-type three-level half-bridge topology, a flying-capacitor full-bridge topology, and a hybrid five-level full-bridge topology; and
    the main circuit in the high-voltage isolated DC/DC converter has any one of: an LC series resonant topology, an LLC series resonant topology, a power bidirectional LC series resonant topology, a power bidirectional LLC series resonant topology, a dual active DC/DC topology and a full-bridge DC/DC topology.

11. The medium and high voltage energy conversion system according to claim 1, wherein the common DC bus is connected to at least one photovoltaic module through a plurality of maximum power point tracking (MPPT) devices for achieving MPPT control; or
    the common DC bus is connected to a DC grid.

12. The medium and high voltage energy conversion system according to claim 11, wherein the common DC bus is further connected to at least one of a load and a storage battery through a non-isolated DC/DC converter.

13. The medium and high voltage energy conversion system according to claim 11, wherein each of the MPPT devices comprises: a third main circuit, a third communication module, a third detection module, a third auxiliary power supply, and at least one third controller, and wherein
    the third controller is configured to control the third main circuit in response to a control instruction from the system controller, detect and output a state of the MPPT device, wherein the control on the third main circuit comprises the MPPT control implemented through controlling an operation of a switch transistor in the third main circuit;

the third detection module is configured to detect a voltage, a current, a temperature, and an arc of the MPPT device;

the third communication module is configured to implement communication between the third controller and the system controller; and the third auxiliary power supply is configured to supply power to the third communication module, the third detection module, and the third controller.

\* \* \* \* \*